T. L. DOUGLASS.
STEAM TRAP.
APPLICATION FILED JULY 23, 1917.
1,256,299.
Patented Feb. 12, 1918.
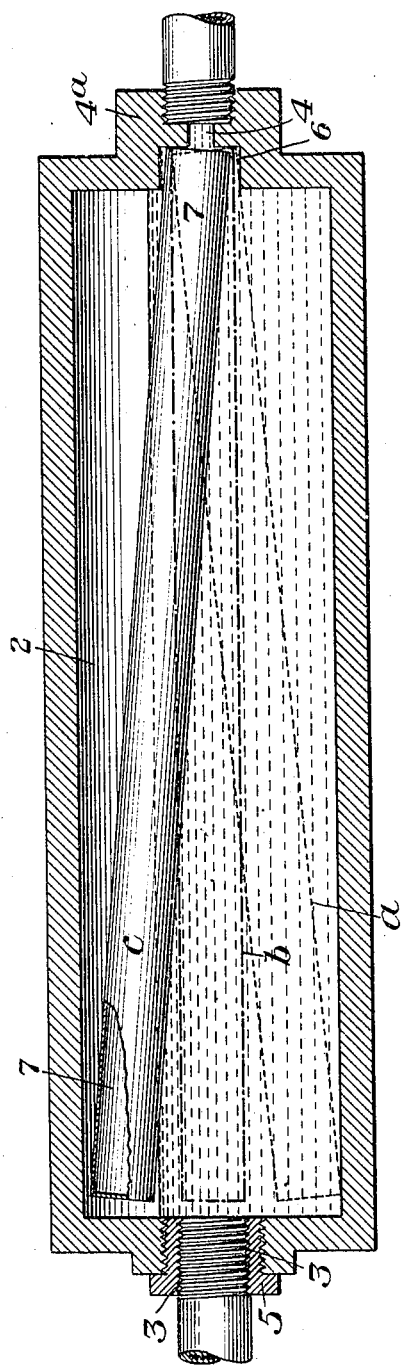
WITNESSES
INVENTOR

UNITED STATES PATENT OFFICE.

THOMAS L. DOUGLASS, OF BEAVER FALLS, PENNSYLVANIA.

STEAM-TRAP.

1,256,299.

Specification of Letters Patent. Patented Feb. 12, 1918.

Application filed July 23, 1917. Serial No. 182,115.

*To all whom it may concern:*

Be it known that I, THOMAS L. DOUGLASS, a citizen of the United States, residing at Beaver Falls, Beaver county, State of Pennsylvania, have invented a new and useful Improvement in Steam-Traps, of which the following is a full, clear, and exact description, reference being had to the accompanying drawings, in which the figure is a longitudinal section of a steam-trap embodying my invention.

My invention has relation to steam traps, and is designed to provide a simple and efficient form of trap, which will require little if any attention to obtain its correct operation, which can be manufactured and sold at a relatively low cost, and the discharge of which is of such character as not to become easily clogged by scale or other dirt carried by the stem.

The nature of my invention will be best understood by reference to the accompanying drawings, in which I have shown the preferred embodiment thereof and which will now be described, it being premised, however, that various changes can be made in the details of construction and arrangement and combination of the several parts without departing from the spirit and scope of my invention as defined in the appended claims.

In the drawing, the numeral 2 designates a receptacle of relatively elongated character and which is closed except for a steam air and water inlet opening 3, at one end, and a water and air discharge opening 4 at the opposite end. The inlet opening is preferably provided with a reducer 5, which forms a means for connecting the trap into a steam line and permits the placing and removal of the float. The discharge opening 4 is also provided with an enlarged internally threaded portion 4ª, for connection with a discharge pipe. The discharge end of the trap is formed with the internal recess 6, surrounding the discharge opening 4. 7 designates a combined valve and float of any suitable material. In the drawing, I have shown this member as consisting of a hollow metal body of circular cross section closed at its ends and preferably formed of some non-corrosive metal. This combined float and valve preferably extends nearly the full length of the trap chamber, being insertible through the opening 3, when reducer 5 is removed, its opposite end face forming a valve for the discharge opening 4.

The operation is as follows: When the trap is empty, the float and valve 7 is in the dotted position *a*, permitting discharge of air through discharge opening 4, its rear end resting on the bottom of the trap chamber and its valve-forming end being within the recess 6, as shown. As the water collects in the trap chamber, this member gradually rises, until it assumes the dotted position *b*, where it is substantially horizontal, and closes the discharge opening 4. The water will now more rapidly accumulate in the trap chamber and will raise the float member to the position *c*, shown in full lines. In this position, there will be a water-escape opening between the valve-forming end and the seating surface around the discharge opening 4, which will permit of the free discharge of water, and a substantially constant water level will be maintained in the trap chamber.

My invention provides an extremely simple and efficient form of trap. The combined float and valve forms the only movable member, and is the only valve of any kind which it is necessary to employ. During the time that water of condensation is initially collected in the trap chamber, the float member is in a position to permit of the escape of air from said chamber. The trap will continue to operate without attention. I am also able to provide a discharge opening 4 of sufficient dimensions so that it will not easily become clogged by pipe scale, or other dirt, carried into the chamber by the steam. While any suitable arrangement of guides may be provided for the combined float and valve member, ordinarily, however, I do not find these to be necessary, since the necessary centering will be performed by the recess 6, assisted by the direction of circulation of the water within the trap chamber. In fact, a slight lateral movement of the float member is not objectionable, since such movement consists in clearing the discharge space between its ends and the opening 4 of any dirt or obstruction which may collect in such space. Should this space become choked or clogged, the level of water in the chamber will rise, thereby moving the float member to a more extreme angular position within its limit of movement, and this will act to at once enlarge the opening and permit it to free itself of the obstruction.

I claim:

1. A steam trap comprising an elongated receptacle having a steam and water inlet and a water outlet, and an unattached elongated combined float and valve member in said receptacle, the longitudinal axis of the member extending lengthwise within the receptacle, said member having one end facing the outlet and arranged to seat over the outlet opening when the float member is in approximately a horizontal plane, and means for causing said member to fulcrum at a point adjacent to the outlet when the water rises above a predetermined level to open the outlet and permit the water to flow therethrough, substantially as described.

2. A steam trap comprising a receptacle having a steam and water inlet and a water outlet, an unattached elongated combined float and valve member in said receptacle, a valve seat at the inner and of the outlet opening, the end of said member facing the outlet being arranged to engage the seat at the inner end of the outlet to close said outlet when the water is at a predetermined level, and means to cause one end of said member to rise above the other end when the height of the water passes beyond a certain level to move the end of said member at an angle to the seat and permit the water to pass out through the outlet opening, substantially as described.

3. A steam trap comprising a receptacle having a relatively long horizontally extending trap chamber therein, an inlet opening, there also being a discharge opening, an unattached elongated float and valve member within said chamber, a valve seat at the inner end of the outlet opening, the valve member having one end arranged to engage said seat to close the outlet opening when said member is in a horizontal position, and means for causing said member to fulcrum at a point adjacent to the seat when the water in the chamber rises above a predetermined level to uncover the outlet opening, substantially as described.

4. A steam trap comprising a receptacle having a relatively long horizontally extending trap chamber therein with an inlet opening at one end and a discharge opening at the opposite end, an unattached cylindrical float and valve member within said chamber, said float being relatively long in comparison to its diameter, the longitudinal axis of the float normally lying in a horizontal plane, a valve seat at the inner end of the outlet opening, the float having one end shaped to engage the seat to close said opening when the float member is in a horizontal position, and means for causing said float to assume an angular position when the water within the chamber rises above a predetermined level to shift the end of said member at an angle to the seat to open the outlet, substantially as described.

5. A steam trap comprising a receptacle having a relatively long horizontally extending trap chamber therein with an inlet opening at one end and a discharge opening at the opposite end, there being an annular recess within the receptacle surrounding the outlet opening, the end of said recess being arranged to form a valve seat, a cylindrical valve and float member within the trap chamber and of greater length than the main chamber, one end of said valve member lying within the recess, while the end thereof is arranged to engage the seat when the float is in a horizontal position, said float and valve member being arranged to fulcrum about the edge of the recess to open the outlet when the float member assumes a position at an angle to the horizontal, substantially as described.

In testimony whereof, I have hereunto set my hand.

T. L. DOUGLASS.

Copies of this patent may be obtained for five cents each, by addressing the "Commissioner of Patents, Washington, D. C."